(12) United States Patent
Dewan et al.

(10) Patent No.: US 9,786,205 B2
(45) Date of Patent: Oct. 10, 2017

(54) TECHNIQUES FOR ENFORCING A DEPTH ORDER POLICY FOR GRAPHICS IN A DISPLAY SCENE

(71) Applicant: INTEL CORPORATION, Santa Clara, CA (US)

(72) Inventors: Prashant Dewan, Hillsboro, OR (US); Uttam Sengupta, Portland, OR (US); Uday R. Savagaonkar, Portland, OR (US); Siddhartha Chhabra, Hillsboro, OR (US); David Durham, Beaverton, OR (US); Xiaozhu Kang, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 283 days.

(21) Appl. No.: 14/369,551

(22) PCT Filed: Dec. 23, 2013

(86) PCT No.: PCT/US2013/077565
§ 371 (c)(1),
(2) Date: Jun. 27, 2014

(87) PCT Pub. No.: WO2015/099670
PCT Pub. Date: Jul. 2, 2015

(65) Prior Publication Data
US 2015/0180657 A1    Jun. 25, 2015

(51) Int. Cl.
*G06F 21/60*    (2013.01)
*G09C 5/00*    (2006.01)

(52) U.S. Cl.
CPC ..................................... *G09C 5/00* (2013.01)

(58) Field of Classification Search
CPC ....................................................... G06F 21/60
See application file for complete search history.

(56) References Cited

U.S. PATENT DOCUMENTS

| 5,715,316 | A | * | 2/1998 | Steenblik | G09C 5/00 |
| | | | | | 273/157 A |
| 5,721,781 | A | * | 2/1998 | Deo | G06Q 20/341 |
| | | | | | 705/67 |
| 5,812,138 | A | | 9/1998 | Devic | |
| 7,159,112 | B1 | * | 1/2007 | Williams | G06F 21/84 |
| | | | | | 380/54 |
| 8,971,568 | B1 | * | 3/2015 | Smits | G06F 3/03545 |
| | | | | | 348/169 |
| 9,264,265 | B1 | * | 2/2016 | Wei | H04L 25/03299 |

(Continued)

OTHER PUBLICATIONS

International Search Report and Written Opinion received for PCT Patent Application No. PCT/US2013/077565, dated Sep. 22, 2014, 9 pages.

*Primary Examiner* — William Powers

(57) ABSTRACT

Various embodiments are generally directed an apparatus and method for processing an encrypted graphic with a decryption key associated with a depth order policy including a depth position of a display scene, generating a graphic from the encrypted graphic when the encrypted graphic is successfully decrypted using the decryption key and assigning the graphic to a plane at the depth position of the display scene when the encrypted graphic is successfully decrypted.

25 Claims, 10 Drawing Sheets

(56) References Cited

U.S. PATENT DOCUMENTS

| | | | |
|---|---|---|---|
| 2002/0175923 A1* | 11/2002 | Lin | G06T 15/40 345/629 |
| 2004/0174998 A1* | 9/2004 | Youatt | H04N 7/1675 380/210 |
| 2005/0187966 A1* | 8/2005 | Iino | H04L 63/065 |
| 2009/0102837 A1* | 4/2009 | Kang | G06T 15/503 345/419 |
| 2012/0066709 A1 | 3/2012 | Ahn | |
| 2012/0113103 A1 | 5/2012 | Kim et al. | |
| 2014/0212057 A1* | 7/2014 | Konnola | G06T 9/00 382/232 |

\* cited by examiner

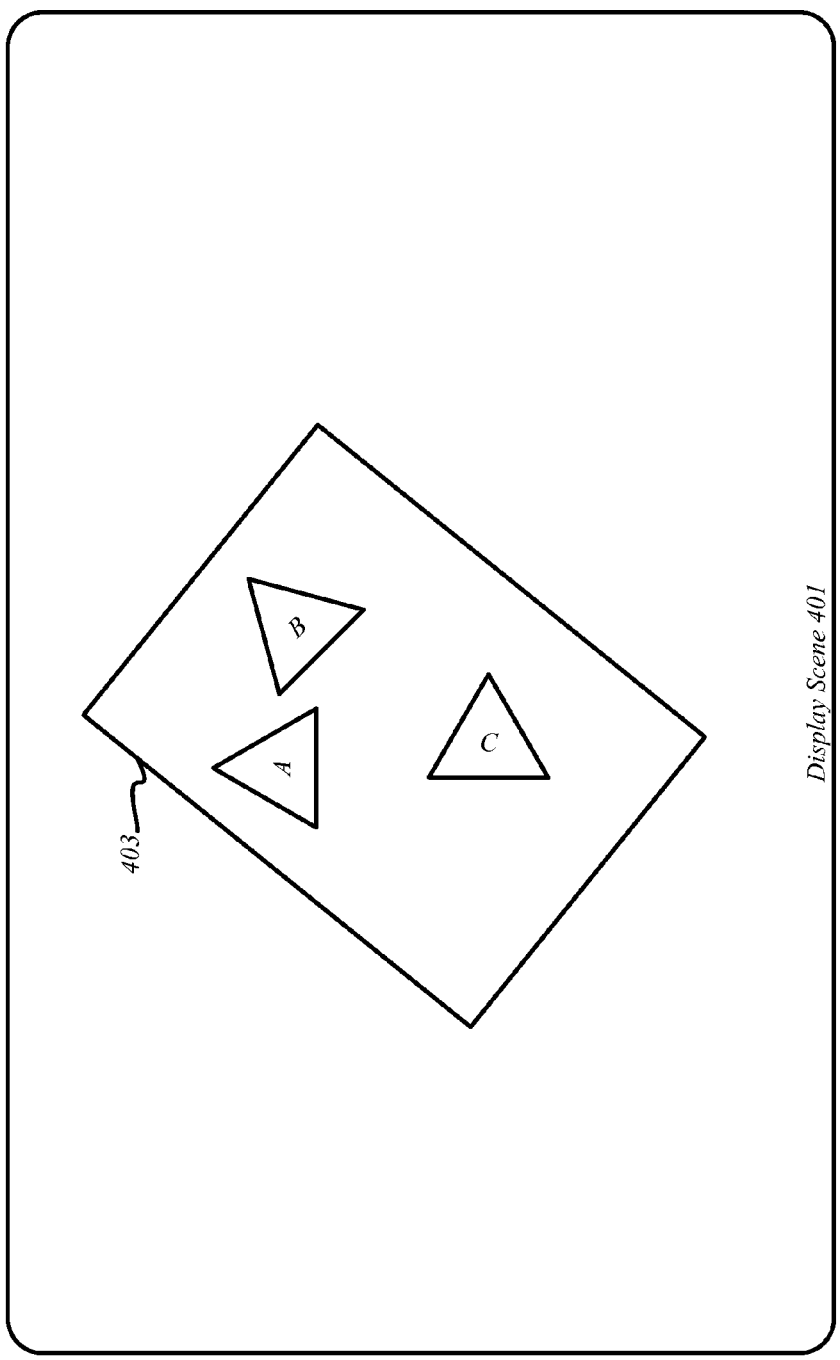

500

```
PROCESS AN ENCRYPTED GRAPHIC WITH A DECRYPTION
KEY ASSOCIATED WITH A DEPTH ORDER POLICY
INCLUDING A DEPTH POSITION OF A DISPLAY SCENE
505
```

```
GENERATE A GRAPHIC FROM THE ENCRYPTED GRAPHIC
WHEN THE ENCRYPTED GRAPHIC IS SUCCESSFULLY
DECRYPTED USING THE DECRYPTION KEY
510
```

```
ASSIGN THE GRAPHIC TO PLANE AT THE DEPTH POSITION
OF THE DISPLAY SCENE WHEN THE ENCRYPTED GRAPHIC IS
SUCCESSFULLY DECRYPTED
515
```

*FIG. 5*

TECHNIQUES FOR ENFORCING A DEPTH ORDER POLICY FOR GRAPHICS IN A DISPLAY SCENE

TECHNICAL FIELD

Embodiments described herein generally relate to processing graphics for a display scene. In particular, embodiments relate to processing encrypted graphics for presentation in a display scene according to a depth order policy.

BACKGROUND

In many situations, computer users access and update confidential or sensitive information using computer based applications. This confidential or sensitive information may include confidential emails, blueprints, project reports, company statistics/charts, chat communications via Instant Messenger, personal medical reports, banking information and the like. When such information is accessed, it is necessary to protect the information to make sure it is not leaked or shared by any means when communicated from the application to the display scene on a display device via one or more processing modules, subsystems, communications links, etc.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 illustrates an exemplary embodiment of a third logic flow diagram for processing graphics.

DETAILED DESCRIPTION

Figure 1:
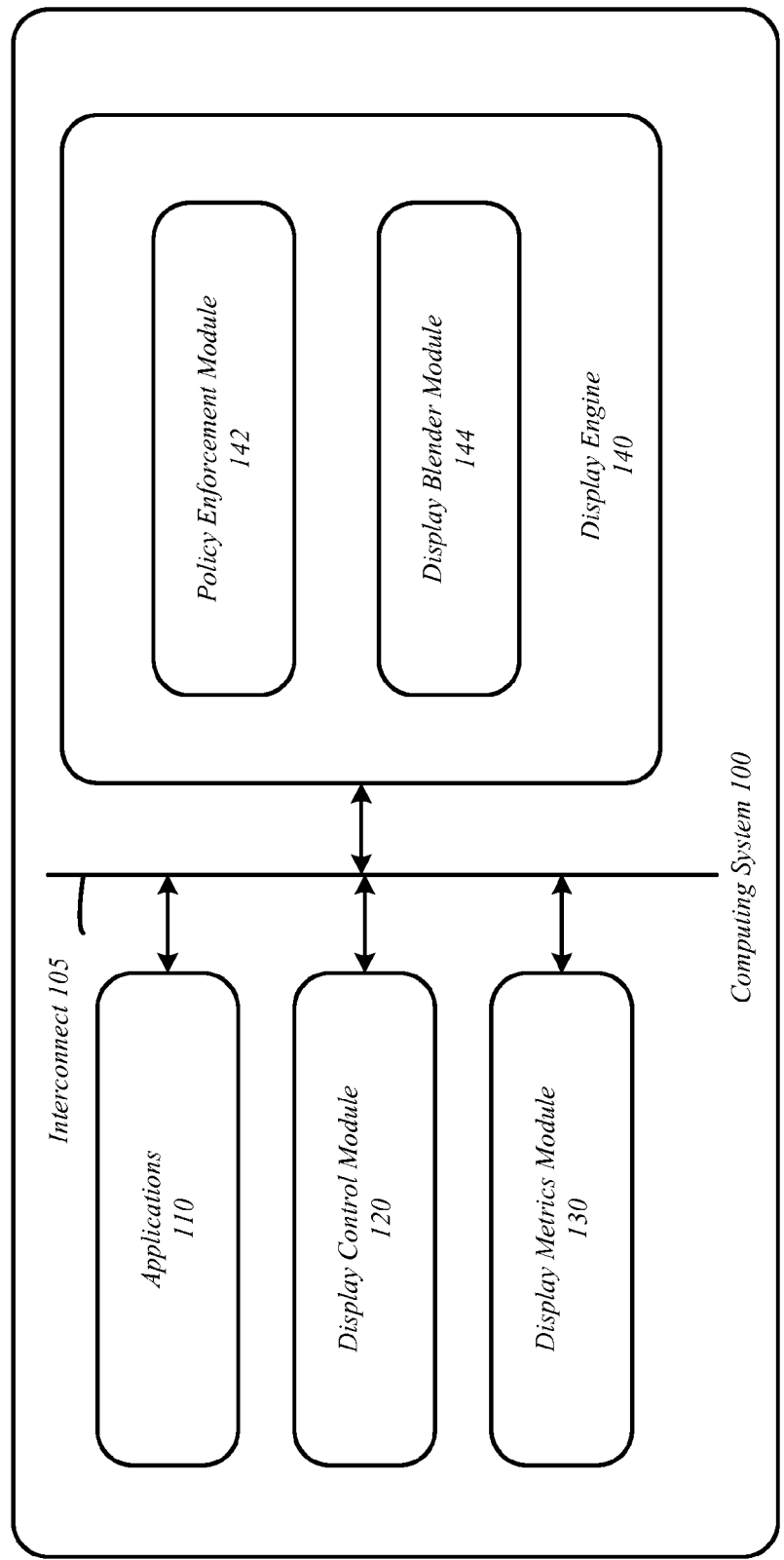
FIG. 1 illustrates an exemplary embodiment of a computing system for processing graphics.

As previously discussed, a user may view or be presented with confidential or sensitive information in a display scene on a display device. The confidential or sensitive information may be presented to a user in a graphic or image including objects, shapes, polygons, symbols, text and the like. The confidential or sensitive information must be communicated from the application generating the information to a display scene and display device in a secure manner such that the information is not compromised.

In various embodiments, the graphics or images including the confidential or sensitive information may be encrypted with an encryption key of the application generating the information. The encrypted graphic may be communicated to a display engine for presenting in a display scene on a display device. As will become apparent in the following description, one or more modules of the display engine, such as a policy enforcement module, may receive a decryption key for decrypting the encrypted graphic in a securely transmitted package communicated prior to the communication of the encrypted graphic. The policy enforcement module may receive the encrypted graphic and process the graphic with the decryption key.

Upon successful decryption of the encrypted graphic, the policy enforcement module may communicate the graphic to a display blender module for processing and presenting in the display scene.

In some embodiments, the confidential or sensitive information may be presented with other information in the display scene. For example, the display scene may include a number of graphics, windows, panes, layers, etc., presenting information to the user. The application generating the confidential or sensitive information may request that the information be presented in the display scene at a particular depth position. For example, the application may request that the confidential or sensitive information be presented at a front depth position such that it is not overlapped by any other information, graphics, windows, panes, layers, etc. The application may request that a depth order policy including a depth position be generated for presenting the information in the display scene at the depth position. The depth order policy may also be communicated to the policy enforcement module in the package including the application's decryption key.

In various embodiments, the policy enforcement module may determine if the depth order policy is enforceable or unenforceable. In particular, the policy enforcement module may communicate the depth order policy to the display blender module and the display blender module may determine if any conflicts exist between the depth order policy and any other depth order policies for other graphics. For example, the display blender module may determine if the depth order policy requests that the graphic be displayed or presented at a same depth position as another depth order policy, and if so, if any overlapping occurs between graphics.

When a conflict does not exist, the display blender module may notify or communicate to the policy enforcement module that the depth order policy is enforceable. However, when a conflict does exists, the display blender module may determine which depth order policy is enforceable based on one or more tie-breaker criteria and may notify the policy enforcement module as to which depth order policy is enforceable and which is not enforceable. The policy enforcement module may notify a display control module to send the encrypted graphic if the depth order policy is enforceable or to discard the graphic if the depth order policy is unenforceable. These and other details will become apparent with the following description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

FIG. 1 illustrates a general overview of an exemplary computing system 100 for processing graphics for a display scene and depth order policies. Computing system 100 includes one or more applications 110, a display control module 120 and a display metrics module 130. In addition, the computing system 100 may include a display engine 140 including a policy enforcement module (PEM) 142 and a display blender module 144. The display engine 140 and modules may be included as part of one or more of a graphics processing unit (GPU), a display controller and a graphics processing pipeline for processing graphics for a display device.

The various modules of the computing system 100 may communicate with each other via interconnect 105, such as one or more buses, control lines, and data lines. Moreover, the various modules may communicate information with each other via any software communication method, such as a message, a HTML message, an XML message, a call, a function call, middleware, Common Object Request Broker Architecture (CORBA), or any other type of signal or communication technique. In various embodiments, the modules may communicate with each other utilizing one or more secure communication techniques.

In various embodiments, the modules of computing system 100 may be implemented in various hardware and/or software elements for generating, processing, confirming and enforcing depth order polices. In some embodiments, the modules may be implemented in software only or hardware only. However, various embodiments may not be limited in this manner, and the modules may be implemented in any combination of hardware and software.

Application 110 may be any type of application or software. In various embodiments, application 110 may be enterprise software, accounting software, banking software, office suites, graphics software, gaming software, media software, web-based application, computer system software, educational software, simulation software, content access software, media development software, product engineering software, and so forth. Application 110 is not limited in this manner; application 110 may be any type of application or software for processing data on a computing system 100. In various embodiments, computing system 100 may include more than one application.

Application 110 may request to present information in one or more graphics in a display scene on a display device. A graphic may include any image, shape, object, polygon, etc. for presenting information, data, illustrations, etc. to a user of the computing system 100. In various embodiments, the graphic may be in any format including, but not limited to, a raster format such as Joint Photographic Experts Group (JPEG), Exchangeable graphic file format (Exif), Tagged Graphic File Format (TIFF), raw graphic format (RAW), graphics interchange format (GIF), bitmap (BMP), portable network graphics (PNG), portable arbitrary format (PAM), and any vector format such as computer graphics metafile (CGM), scalable vector graphics (SVG), etc. Furthermore, the graphic may be in a text-only format such as rich text format (RTF), plain text format, enriched text format, and the like.

In some embodiments, the application 110 may present one or more graphics or information that is confidential or sensitive, and therefore, must be transmitted securely between the various components and modules of the computing system 110. Thus, Application 110 may be associated with or include an encryption/decryption key pair for encrypting one or more graphics for communicating the graphics between the various modules of the computing system 100 over interconnect 105 and over one or more network connections. In embodiments where the computing system 100 has more than one application 110, each application may be associated with or include unique key pairs. Therefore, an application cannot use the same key pair as another application reducing the risk that the application or a user can spoof another application's keys.

In addition, application 110 may want to present to the user the one or more graphics in a display scene at a particular depth position. In various embodiments, a display scene may be a two dimensional or three-dimensional screen space and may include any number of different layers or planes each having one or more graphics to display or present information to a user.

In some embodiments, the application 110 may send a request to a display control module 120 to generate a depth order policy placing the one or more graphics at a particular depth position. For example, the application 110 may request that one or more graphics including confidential information be presented to a user at a front depth position such that no other graphics or information covers up the confidential information. The front position in the display scene may be the position "closest" to a user or may be a position that does not have any other graphics in front of or overlapping of it.

The display control module 120 may receive the request and generate a depth order policy based on the request. In addition, the display control module 120 may associate the depth order policy with the key pair for the application requesting the depth order policy and assign the depth order policy to the one or more graphics. For example, the application 110 may request a depth order policy for three graphics to be displayed in a front depth position. The display control module 120 may create a depth order policy having a depth position of "1" for the three graphics to be displayed and assign the depth order policy to the three graphics. Assigning the depth order of "1" to the three graphics indicates that the three graphics are to be positioned in a plane or layer in the front depth position of the display scene. Various embodiments are not limited to using "1" to indicate that the three graphics are to be displayed at the front depth position, any number, letter or symbol may be defined and used to indicate graphics are to be presented in a plane at the depth position of the display scene.

In various embodiments, the display control module 120 may assign a depth order policy to the one or more graphics to position them at any depth position in one of any number of planes or layers of a display scene. For example, the display control module 120 may assign a depth position of "2" to one or more graphics to position the graphics in a plane directly behind the front depth position. Thus, any graphic that is to be displayed in that plane will not be at the front depth position, but will be directly behind the front depth position. In this example, graphics requested to be in the front depth position may overlap the graphics placed at the depth position behind the front depth position. In this case, the depth order policy is still enforceable since the application requested the graphics to be placed at that particular depth position.

In addition and as previously stated, the display control module 120 may associate the depth order policy with the key pair of the application requesting the depth order policy. Thus, the depth order policy associated with the key pair may be honored for graphics encrypted with the encryption key and decrypted with decryption key of the application and the graphics may be placed in the display scene based on the depth order policy. Any graphic not encrypted with the encryption key associated with the depth order policy will not be enforced and will not be placed in a plane or layer according to the depth order policy.

The display control module 120 may then create a depth order package including the depth order policy and the decryption keys for the application requesting the depth order policy. Furthermore, the depth order package may include information indicating that any graphics encrypted with the encryption key for the application is to be displayed in the plane or layer according to the depth order policy. For example, if the depth order policy assigned three graphics a "1" based on a request received from the application for displaying three graphics, the graphics will be encrypted with the encryption key and upon successfully decryption will be displayed in the display scene in a plane positioned at the depth position of "1."

In various embodiments, any number of applications may request a depth order policy for one or more graphics to be presented in display scene. The display control module 120 may create a depth order policy and depth order package for each of the applications for processing one or more graphics from each of the applications. As will be discussed in more detail below, conflicts may arise from applications requesting the same depth order policy and overlapping may occur between graphics in the same plane or depth position.

After the display control module 120 generates or creates a depth order package, the display control module 120 may communicate the package to the policy enforcement module (PEM) 142 for verification and confirmation that the depth order policy is enforceable. As previously discussed, the one or more graphics may include confidential or sensitive information and may be encrypted. Thus, the depth order package including the depth order policy and the application's key pair may need to be securely communicated to the policy enforcement module 142 so that secure information is not compromised.

In various embodiments, the computing system 100 may include a secure global encryption/decryption key pair to encrypt the depth order package to communicate to the policy enforcement module 142. For example, the display control module 120 may encrypt the depth order package including the depth order policy and the requesting application's decryption with the global encryption key and then communicate the package to the policy enforcement module 142. The policy enforcement module 142 may have the global decryption key and decrypt the depth order package. In various embodiments, the global key pair or only the global decryption key may be securely transferred to the policy enforcement module 142 prior to processing the display scene utilizing some form of secure communication.

The policy enforcement module 142 may receive the depth order package from the display control module and decrypt the package using the global decryption key. In various embodiments, the policy enforcement module 142 may ensure and verify that the depth order package was securely transferred and no errors occurred during the transfer. For example, various hash verification techniques may be used to verify that the depth order package was received without any errors and the information in the package was not compromised.

The policy enforcement module 142 may also verify that the depth order policy in the depth order package is enforceable. More specifically, the policy enforcement module 142 may communicate with the display blender module 144 to determine if the depth order policy conflicts with any other depth order policies. The policy enforcement module 142 may send the depth order policy to the display blender module 144.

The display blender module 144 may receive the depth order policy, determine if any other depth order policies for the display scene exist and determine if there is a conflict between the received depth order policy and any other depth order policies. More specifically, the display blender module 144 may determine if any other depth order policies assign one or more graphics to the same depth position as the received depth order policy and if they overlap any other graphics.

If no conflicts exist, the display blender module 144 may notify the policy enforcement module 142 that no conflicts exist and the received depth policy is enforceable. However, when more than one depth order policy assigns the same depth position to one or more graphics, the display blender module 144 must determine if overlapping exists between any of the graphics.

The display blender module 144 may determine overlapping using a technique such as the "painter's algorithm" or any other technique to determine overlapping of graphics in a display scene. If no overlapping exists, all the depth order policies may be honored and the one or more graphics may be placed into a plane or layer based their respective depth order policies. Further, the display blender module 144 may notify the policy enforcement module 142 that the received depth order policy is enforceable.

However if overlapping does exists, the display blender module 144 may determine which of the policies to enforce based one or more tie breaker criteria. One criterion may be a priority level for a given application. For example, the display blender module 144 may determine the depth order policy to enforce based on an assigned priority. Applications may be assigned priority levels and the depth order policy for the application having the highest priority level will be honored.

Another criterion maybe the order in which the depth order policies were received. For example, the depth order policy received first may be honored and all other conflicting depth order policies may be discarded. However, in some embodiments, the depth order policy received last may be honored. The display blender module 144 may notify the policy enforcement module 142 if the received depth order policy is enforceable or unenforceable and any other depth order policies that are enforceable or unenforceable.

The policy enforcement module 142 may receive information from the display blender module 144 indicating whether a depth order policy is enforceable or unenforceable. When the depth order policy is determined to be enforceable, the policy information module 142 may send a notification to the display control module 120 that the depth order policy is enforceable and a request to communicate the one or more graphics associated with the depth order policy to the policy enforcement module 142 for processing. When the depth order policy is determined to be unenforceable, the policy enforcement module 142 may notify the application that requested the depth order policy that it is unenforceable and notify the display control module 120 to discard the depth order policy and associated keys. The policy enforcement module 142 may also discard any received encrypted graphics associated with the unenforceable depth order policy and encrypted with the discarded encryption key.

In various embodiments, the display control module 120 may receive information that a depth order policy is enforceable or unenforceable and process this information accordingly. In some embodiments, the display control module 120 may receive information that a depth order policy is enforceable as a request to send the one or more graphics associated with the depth order policy to the display engine 140 and policy enforcement module 142. The display control module 120 may encrypt the graphics associated with the enforceable depth order policy with the encryption key from the application requesting the enforceable depth order policy.

The display control module 120 may send or communicate the one or more encrypted graphics to the policy enforcement module 142. In various embodiments, the display control module 120 may send the graphics on a per graphic basis in an order specified by the application when there are more than one graphics associated with the depth order policy. The policy enforcement module 142 may receive the one or more encrypted graphics and process them with the decryption key associated with enforceable depth order policy associated with the one or more graphics in the order they are received.

In various embodiments, if the received graphic is not successfully decrypted, the policy enforcement module 142 may discard the graphic and notify the display control module 120 to send the next graphic for processing. If the received graphic is successfully decrypted, the policy enforcement module 142 may send or communicate the decrypted graphic to the display blender module 144 for presenting in the display scene on a display device based on the associated depth order policy. The display control module 120 may continue to send graphics in the order specified by the application and the policy enforcement 142 may process the graphics as they are received.

The display blender module 144 may receive the decrypted graphic from the policy enforcement module 142 and place the graphic in a plane of the display scene according to the depth order policy associated with the graphic. More specifically, the display blender module 144 may assign a number of planes each a depth order position. The display blender module 144 may put the graphic in the plane of the display scene according to the depth order policy associated with the graphic.

For example, if a display scene includes three planes, the display blender module 144 may assign each plane a depth position in the display scene. A first plane may be assigned the front position, a second plane may be assigned a depth position directly behind the first plane or in a middle position, and the third plane may be assigned a depth position directly behind second plane or in a back position. If the depth order policy of the graphic to be displayed in the display scene is "1" indicating that the graphic is to be placed in the front depth position, the display blender module 144 will place the graphic in the first plane assigned the front depth position. If the depth order policy of the graphic is "2" indicating that the graphic is to be place in the middle position or second position, the display blender module 144 will place the graphic in the second plane assigned the middle depth position or second depth position. If the depth order policy of the graphic is "3" indicating that the graphic is to be place in the back position or third position, the display blender module 144 will place the graphic the third plane assigned the back depth position or third depth position. The above example is limited to three planes in a display scene, however, various embodiments are not limited in this manner and a display scene may include any number of planes at any number of depth positions.

In some embodiments, the display blender module 144 may assign all of the graphics having the same enforceable depth order policy to a plane and then assign a depth position to the plane based on the depth order policy. For example, all graphics received having a depth order policy of "1" indicating that the graphics are to be presented or displayed in the front depth position may be put into a particular plane. The display module 144 may then assign the particular plane the depth position to the plane having the graphics.

The display blender module 144 may write graphics to a buffer such as a frame buffer for outputting on a display device. In various embodiments, the display blender module 144 may write the graphics in the order based on the planes they are in and the planes may be processed in an order, such as front-to-back or back-to-front. For example, all the graphics in a plane assigned the front depth position may be written or sent to the buffer first, and then all the graphics in the plane behind the plane assigned the front depth position may be written to the buffer and so on until all of the graphics are written for outputting the display and all the planes are processed. In some embodiments, the display blender module 144 may write the graphics in the reverse order. For example, the graphics in the plane assigned the back position may be first written to the buffer. The graphics assigned to the next closest plane may be written to the buffer next and so on until all the graphics are written to the buffer and the planes processed. In various embodiments, a display device may read the frame buffer and present the display scene for a user to view. Once all of the graphics from all of the applications have been processed, the display control module 120 may discard the depth order policies and keys associated with the depth order policy.

In some embodiments, the computing system 100 may include a display metrics module 130 to receive information on whether graphics are successfully decrypted by the policy enforcement module 142. More specifically, the policy enforcement module 142 may send information indicating that a particular graphic did not decrypt using the decryption key associated with graphic. In addition, the policy enforcement module 142 may send information indicating that a particular graphic was successfully decrypted. The policy enforcement module 142 may send information for each of the graphics processed. The display metrics module 130 may send information including which graphics were successfully decrypted and which were not decrypted to the application requesting the graphics to be displayed.

Figure 2A:
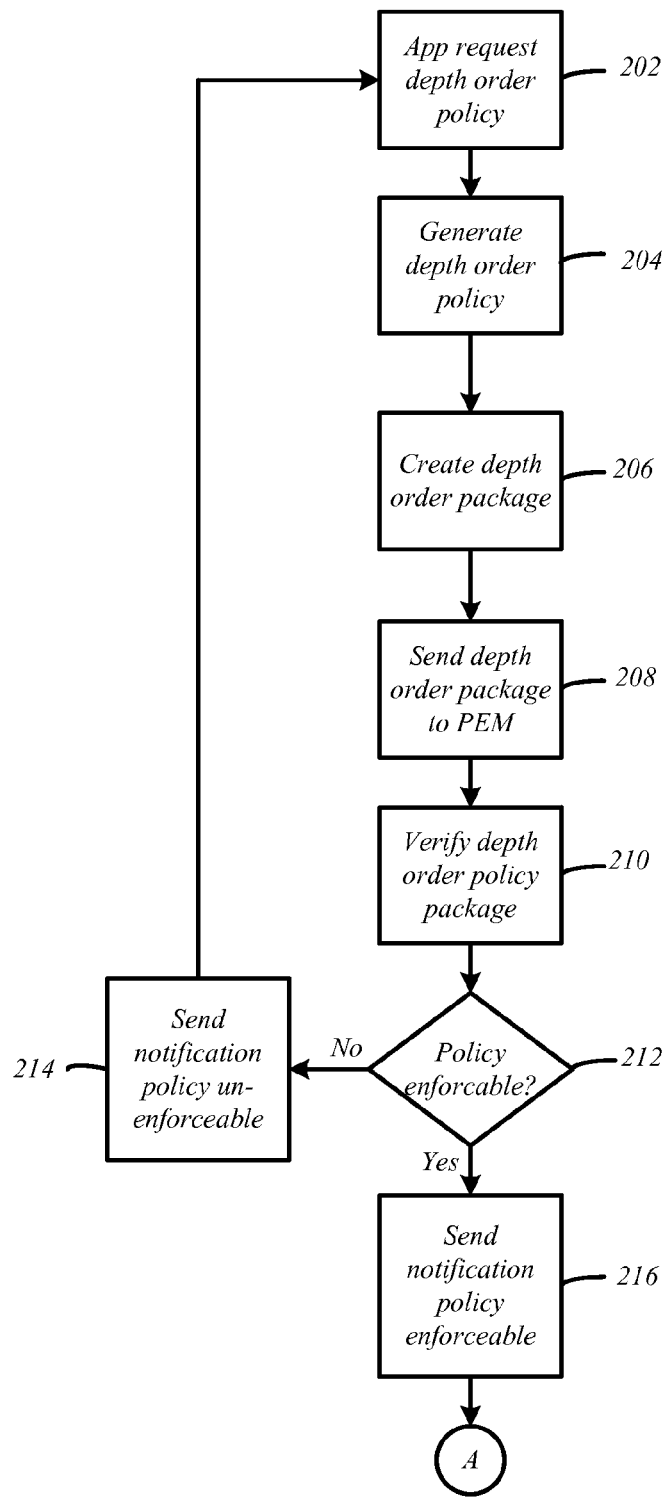
FIGS. 2A/2B illustrate an exemplary embodiment of a first logic flow diagram for processing graphics.
Figure 2B:
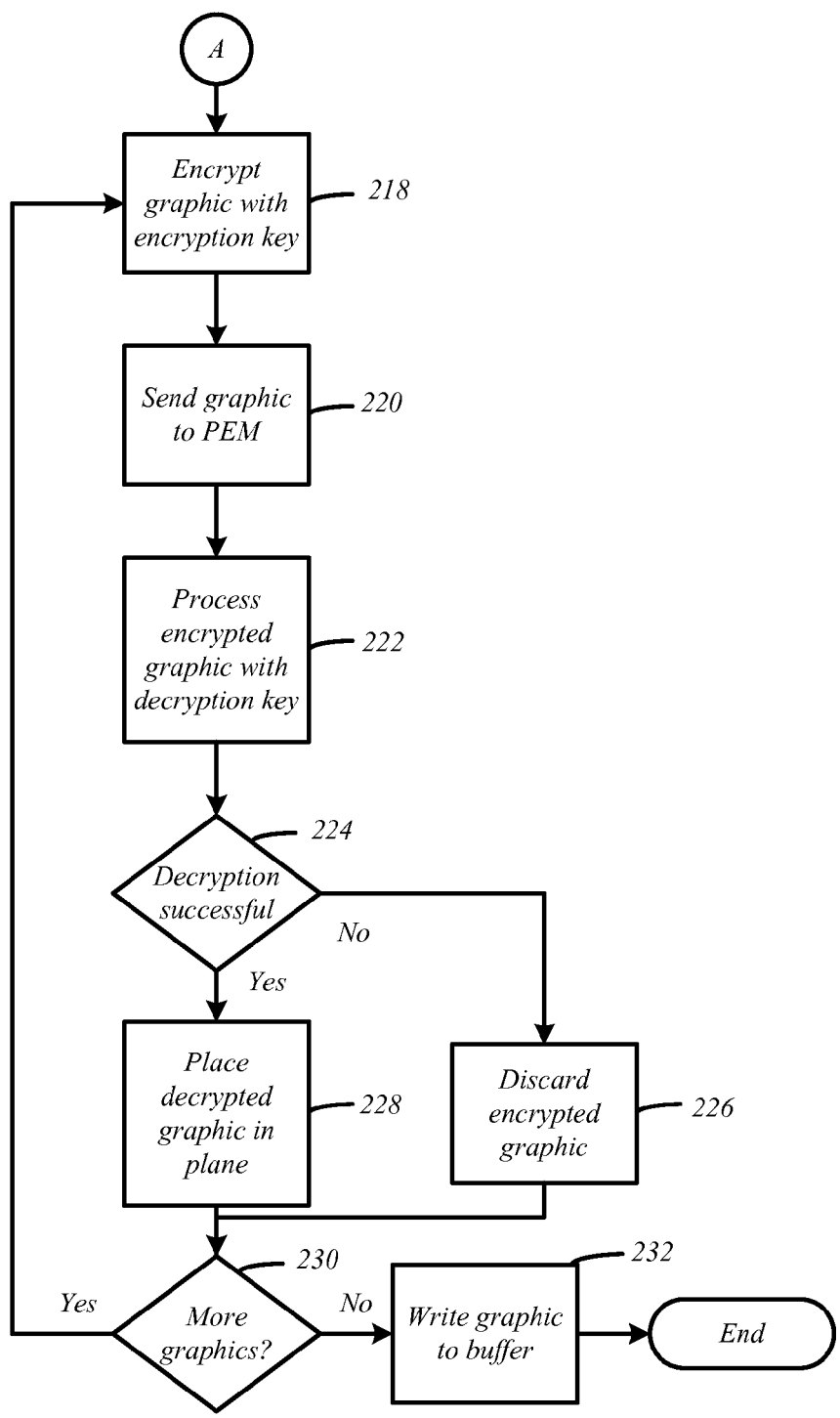

FIG. 2 illustrates an exemplary embodiment of a first logic flow 200 for processing graphics and enforcing a depth order policy. At block 202, an application may request a depth order policy for one or more graphics to be displayed in a plane of a display scene. The request may include information to position the one or more graphics at depth in the display scene, i.e. a depth position. The request may be sent from an application to a display control module of a computing system operable to process the request and generate a depth order policy and a depth order package. In addition, to sending the request, the application may send a key pair to encrypt the one or more graphics for sending over one or more interconnects an communication links. In various embodiments, any number of applications may make a request for a depth order policy for one or more graphics and send key pairs for encrypting their respective one or more graphics.

In some embodiments, a depth order policy may be generated based on the request received from the application at block 204. For example, the application may request that one or more graphics be placed in the front depth position of a display scene. A depth order policy may be generated having information to place the graphics at the front depth position and the policy may be assigned to the graphics for which the application made the request for. In addition, application's key pair may be associated with the display order policy that is generated at block 204. The applications key pair may be associated with the display order policy so that a policy enforcement module may know that the display order policy will only be enforced for graphics encrypted with the encryption associated with the display order policy.

At block 206, a depth order package may be created or generated to send to a policy enforcement module for verifying the package and determining if the generated depth order policy is enforceable or unenforceable. The depth order package may include the generated depth order policy and the key pair associated with the application making the request for the depth order policy. The depth order package may be sent to the policy enforcement module at bock 208. In some embodiments, the package may be sent over one or more secure interconnects and communication links. In addition, the package may be encrypted with a global key so that the information including the depth order policy and the key pair in the package is not compromised.

The policy enforcement module may receive and verify the depth order package at block 210. If the package is encrypted for secure communication, the policy enforcement module may decrypt the package with the global decryption key and may verify that the package was correctly received based on one or more techniques for data verification such as hash verification.

At block 212, a determination may be made as to whether the depth order policy in the depth order package is enforceable or unenforceable. More specifically, a determination may be made if any other depth order policies for a display scene exist and if there is a conflict between the depth order policy received in the package and any other depth order policies. For example a conflict may exist if any other depth order policies assign one or more graphics to the same depth position as the received depth order policy and overlapping exists between graphics.

In the case where more than one depth order policy assigns the same depth position to one or more graphics, a determination is made as to whether overlapping exists between any of the graphics. If no overlapping exists, all the depth order policies may be honored and the one or more graphics may be placed into a plane based their respective depth order policies. However, if overlapping does exist, a determination as to which of the policies to enforce based on one or more tie breaker criteria is made.

If the received depth order policy is unenforceable based on the determination, a notification may be sent indicating the received depth order policy is unenforceable at block 214. If the received depth policy is enforceable, a notification may be sent indicating that the received depth policy is enforceable at block 216. In addition, the notification may include information indicating any other unenforceable depth order policies caused by a conflict with the received depth order policy at block 216.

At block 218, one or more graphics may be encrypted with the encryption key associated with the enforceable depth order policy. More specifically, the one or more graphics in which the depth order policy was assigned to may be encrypted with the encryption key associated with the depth order policy and the application requesting the depth order policy.

An encrypted graphic may be sent to the policy enforcement module for processing at block 220. In the case where more than one graphic is encrypted and assigned the depth order policy, the graphics may be sent to the policy enforcement module one at time until all of the graphics are processed. At block 222, the policy enforcement module may receive the graphic and decrypt the graphic with the decryption key associated with the depth order policy.

At block 224, a determination is made as to whether the encrypted graphic was successfully decrypted or not successfully decrypted. If the encrypted graphic was not successfully decrypted, the encrypted graphic may be discarded at block 226 and information may be sent to a display metrics module indicating that the encrypted graphic was not successfully decrypted. However, if the encrypted graphic was successfully decrypted, the decrypted graphic may be placed into a plane according to the depth order policy associated with the graphic, at block 228. In addition, a notification may be sent to the display metrics module indicating the encrypted graphic was successfully decrypted at block 228.

A determination may be made as to whether any addition graphics need to be sent to the policy enforcement module for processing at decision block 230. If addition graphics need processing, blocks 218 through 230 may be repeated until all of the graphics are processed. However, if all of the graphics have been processed at block 230, the graphics may be written to a frame buffer for display on a display device at block 232. In various embodiments, the graphics may be written to the frame buffer on a plane-by-plane basis and the planes may be processed in an order, such as front-to-back or back-to-front. More specifically, all of the graphics from a particular plane may be written to the frame buffer and then the graphics on the next plane in order may be processed and so on.

Figure 3:
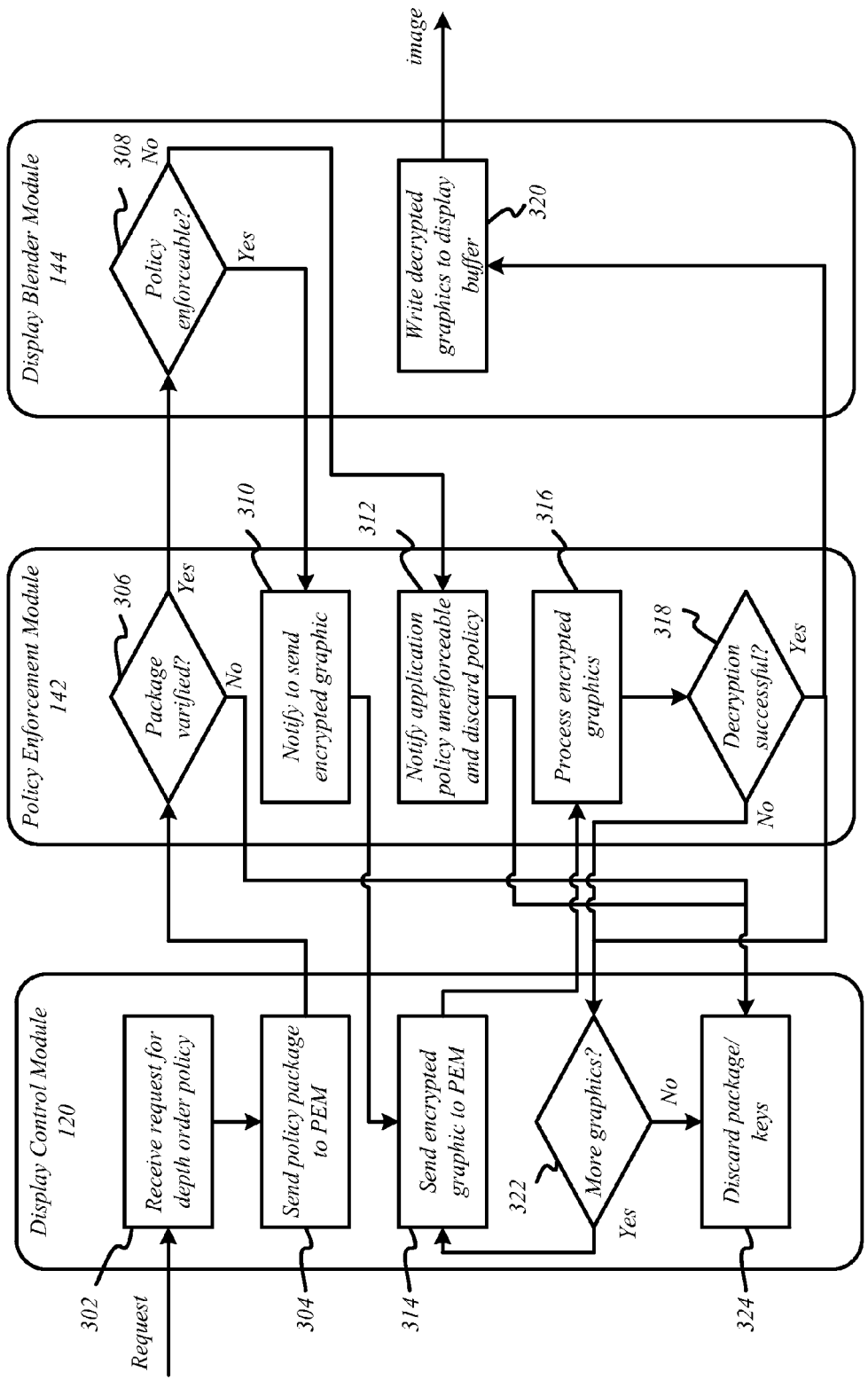
FIG. 3 illustrates an exemplary embodiment of a first signaling flow diagram for processing graphics.

FIG. 3 illustrates an embodiment of a first signaling flow diagram 300 for processing graphics by computing system modules. More specifically, signaling flow diagram 300 illustrates various communications between various modules of the computing system 100 including the display control module 120, the policy enforcement module 142 and the display blender module 144. Although, signaling flow diagram 300 illustrates particular pathways and communications between various modules, some embodiments may not be limited in such a manner and other modules may process and communicate information for enforcing depth order policies.

At block 302 of diagram 300, the display control module 120 may receive a request to generate a display order policy for one or more graphics from an application. In various embodiments, the request may have information indicating a depth position for the one or more graphics to be displayed at in a display scene. For example, the request may indicate that the depth position is to be front depth position in the display scene for the one or more graphics.

As previous discussed, the one or more graphics may contain confidential or sensitive information and various encryption methods may be used to securely transmit the graphics and information associated with the graphics, such as the depth order policy to other modules of the computing system 100. Thus, the application may send an encryption/decryption key pair in the request for use to encrypt and decrypt the graphics and information.

The display control module 120 may generate a display order policy based on the request and assign the policy to the one or more graphics. In addition, the display control module 120 may associate the key pair from the application with the one or more graphics and the depth order policy. In some embodiments, the display control module 120 may generate or create a display order package to send or communicate to the policy enforcement module 142 for processing.

At block 304, the display control module 120 may send or communicate the depth order package to the policy enforcement module 142 for verification and to determine if the depth order policy in the package is enforceable. The display control module 120 may communicate the package securely utilizing a global key pair. The policy enforcement module 142 may receive the depth order package at decision block 306 and verify that the package was communicated with no errors. The policy enforcement module 142 will also decrypt the package before validation if the package was sent or communicated utilizing the global key pair.

If at decision block 306 the package cannot be verified, the policy enforcement module 142 may send or communication the package back to the display control module 120 and the package including the depth order policy and any keys will be discarded at block 324. However, if at decision block 306 the package is verified, the policy enforcement module 142 may send or communicate the depth order policy received in the package to the display blender module 144 at decision block 308. As previously discussed, the display blender module 144 may receive the depth order policy and make a determination as to whether the depth order policy is enforceable. In particular, the display blender module 144 may determine if any conflicts exist between the depth order policy and other depth order policies, as previously discussed. In addition, the display blender module 144 may determine that the depth order policy is still enforceable even if conflicts exists if the depth order policy wins based on tie-breaker criteria, as previously discussed.

At decision block 308, the display blender module 144 may communicate information indicating whether the depth order policy is enforceable or unenforceable to the policy enforcement module 142. At block 312, the policy enforcement module 142 may receive information that the depth order policy is unenforceable and may send the depth order package including the unenforceable depth order policy and associated keys to the display control module 120 to be discarded. The display control module 120 may discard the package at block 324. At block 310, the policy enforcement module 142 may receive information that the depth order policy is enforceable and may send or communicate a notification or message including information to the display control module 120 to send the one or more graphics associated with the enforceable depth order policy.

The display control module 120 may encrypt a graphic and communicate the encrypted graphic to the policy enforcement module 142 at block 314. More specifically, the display control module 120 may encrypt the graphic using the encryption key associated with the graphic and the depth order policy prior to communicating the graphic to the policy enforcement module 142.

At block 316, the policy enforcement module 142 may receive the encrypted graphic from the display control module 120 and may process the encrypted graphic. More specifically, the policy enforcement module 142 may attempt to decrypt the encrypted graphic with the decryption key received in the depth order package received at block 306. At block 316, the policy enforcement module 142 may determine whether the encrypted graphic successfully decrypts or does not successfully decrypt.

If the encrypted graphic does not successfully decrypt the policy enforcement module 142 discards the encrypted graphic at decision block 318 and communicates information to the display control module 120 to determine if more graphics associated with the depth order policy need to be sent to the policy enforcement module 142 at block 322. If the encrypted graphic does successfully decrypt, the policy enforcement module 142 sends or communicates the decrypted graphic to the display blender module 144 and also communicates information to the display control module 120 to determine if more graphics associated with the depth order policy need to be sent to the policy enforcement module 142 at block 318.

The display blender module 144 may receive the decrypted graphic and associate the graphic with a plane having a depth position according to depth order policy associated with the graphic at block 320. The display blender module 144 may also write the graphic to the frame buffer according to the plane in which the decrypted graphic is associated with at block 320. This flow may repeat until all of the graphics are processed for the display scene.

Figure 4B:
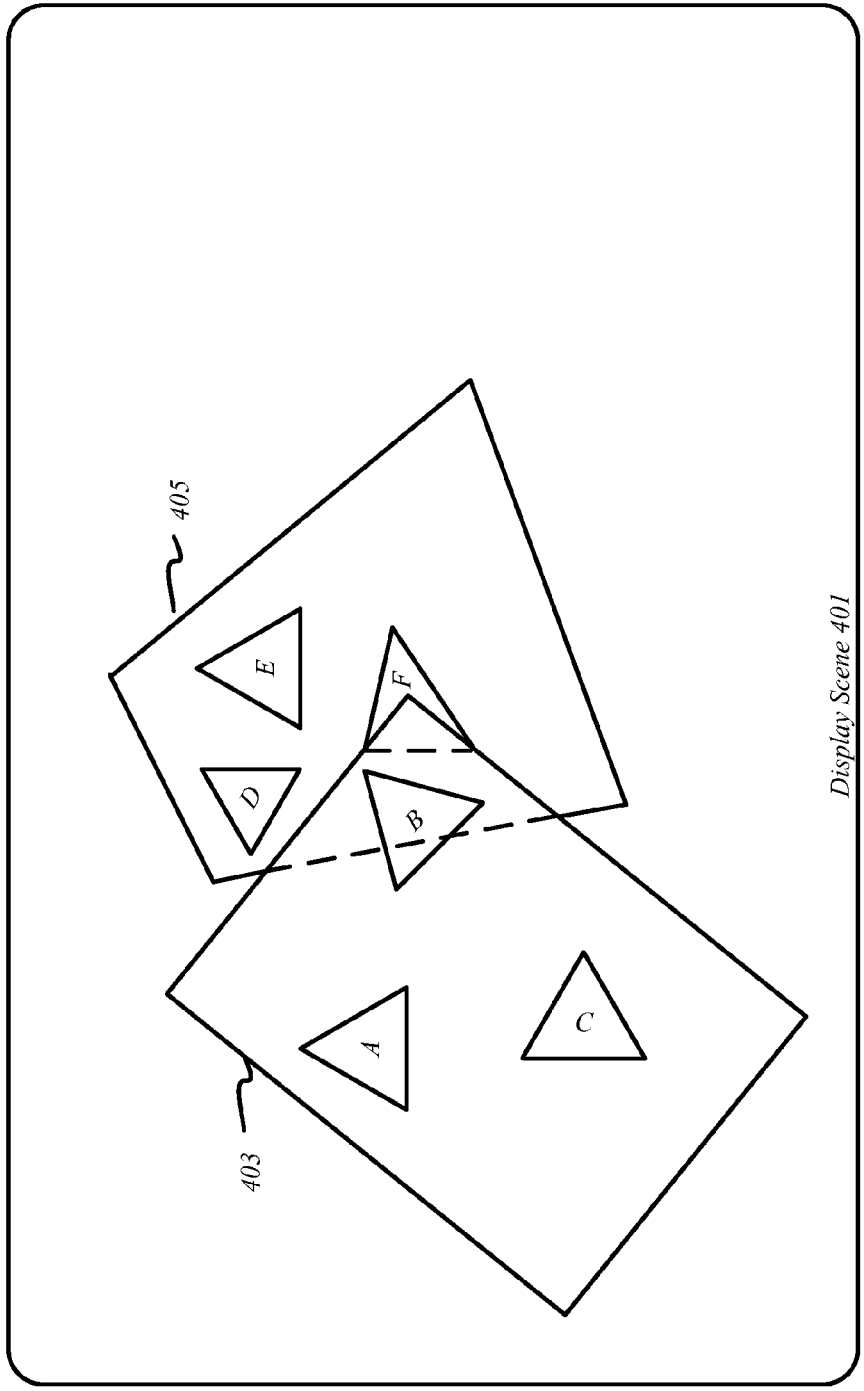
FIGS. 4A/4B/4C illustrate exemplary embodiments of a display scene presenting graphics.
Figure 4C:
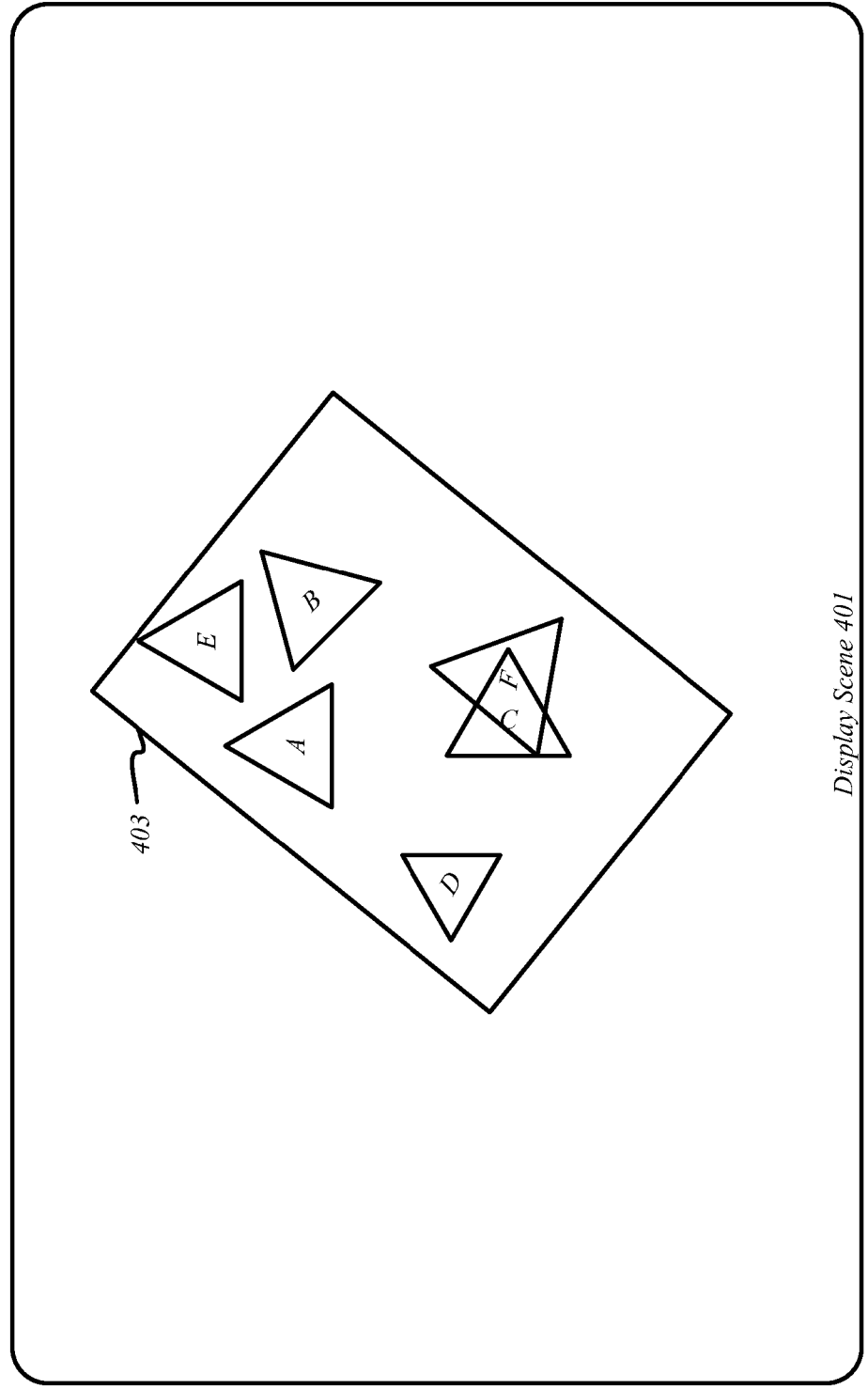

FIGS. 4A/4B/4C illustrate exemplary display scenes 401 having planes and graphics requested to be presented in the display scenes 401. More specifically, FIGS. 4A, 4B and 4C illustrate examples of display scenes having conflicting depth order policies and display scenes not having conflicting depth order policies based on requests made by one or more applications to position graphics according to display order policies. For clarity purposes, the FIGS. 4A, 4B and 4C are discussed with reference to the computing system 100 of FIG. 1.

In FIG. 4A, the display scene 401 includes one display plane 403 having three graphics A, B and C at a depth position of the display plane 403. One or more requests may have been made by one or more applications 110 to place the graphics at the depth position. In some embodiments, one application 110 may have requested to place all three graphics at the depth position. However, in other embodiments, more than one application may have requested to place the graphics at the depth position. For example, one application may have requested that graphic A be placed at the depth position and another application may have requested that graphics B and C be placed at the depth position. A depth order policy may be generated for each request and the display blender module 144 may determine if all the depth order policies are enforceable.

In this example, the blender control module 144 may determine that the depth order policies to position the three graphics A, B, and C at the depth position of the display plane 403 are enforceable because there is no overlapping between graphics, as shown in FIG. 4A. The blender control module 144 may notify the policy enforcement module 142 that the depth order policy is enforceable and the display scene 401 may be presented to the user as shown in FIG. 4A.

FIG. 4B illustrates another exemplary display scene 401 having two planes 403 and 405, each having graphics. In this example, plane 403 may be in front of plane 405. In addition, plane 403 includes graphics A, B and C and plane 405 includes graphics D, E and F. The graphics may be put into or assigned to planes 403 and 405 based on at least one display order policy and request to position the graphics at the depth positions. In this example, one or more requests may have been made to put or assign graphics A, B and C at the depth position of plane 403 and put or assign graphics D, E and F at the depth position of plane 405. In a manner as previously discussed above with respect to FIGS. 1-3, the display blender module 144 may make a determination as to whether the one or more depth order policies to place the graphics A, B, C, D, E and F at depth positions are enforceable. In this example, the display blender module 144 may determine that all the depth order policies are enforceable because there are no conflicts and no overlapping of graphics in the same plane, as shown in FIG. 4B.

FIG. 4C illustrates a third exemplary display scene 401 having a conflict between depth order policies and overlapping graphics. In this example, one or more applications 110 may have requested that graphics C and F be positioned at the same depth position and at least partially the same horizontal and vertical positions in the display scene 401. Thus, either graphic C or graphic F must be shown in front of the other graphic and one of the depth order policies is unenforceable. As previously stated, the display blender module 144 may determine which of the depth order policies are enforceable based on one or more tie breaker criteria when overlapping occurs at the same requested depth position. In this example, the display blender module 144 must determine whether the depth order policy associated with graphic C is enforceable or the depth order policy associated with graphic F is enforceable based on the tie breaker criteria such as the priority or order in which the requests were made. Once the display blender module 144 makes the determination, it will notify the policy enforcement module 142 which depth order policy is enforceable and which is unenforceable and the policy enforcement module 142 will proceed as previously discussed above with respect to FIG. 1-3.

FIG. 5 illustrates an embodiment of logic flow 500. The logic flow 500 may be representative of some or all of the operations executed by one or more embodiments described herein. For example, the logic flow 500 may illustrate operations performed by the systems 100, 600 and 700.

In the illustrated embodiment shown in FIG. 5, the logic flow 500 may include processing an encrypted graphic with a decryption key associated with a depth order policy including a depth position of a display scene at block 505. More specifically, a policy enforcement module may receive an encrypted graphic and process the encrypted graphic with a decryption key received in a depth order package. The depth order package may also include a depth order policy associated with the decryption key for processing graphics from a particular application. The policy enforcement module may receive the encrypted graphic from the particular application via a display control module.

At block 510, the logic flow 500 may include generating a graphic from the encrypted graphic when the encrypted graphic is successfully decrypted using the decryption key. In particular, the policy enforcement module may successfully process the encrypted graphic with the decryption key and generate an unencrypted graphic to send to a display blender module and for presenting on a display device. In addition, the logic 500 may include assigning the graphic to a plane at the depth position of the display scene when the encrypted graphic is successfully decrypted, at block 515. The display blender module may receive the unencrypted graphic and assign the graphic to a plane to honor enforce the depth order policy requested by the application presenting the graphics in the display scene. Moreover, the display blender module may assign the graphic to the graphic and then write the graphic to a buffer for presenting the graphic on a display device in the display scene. In various embodiments logic flow 500 may be repeated until all of the graphics for the display scene are processed and the display scene is presented on a display device.

Figure 6:
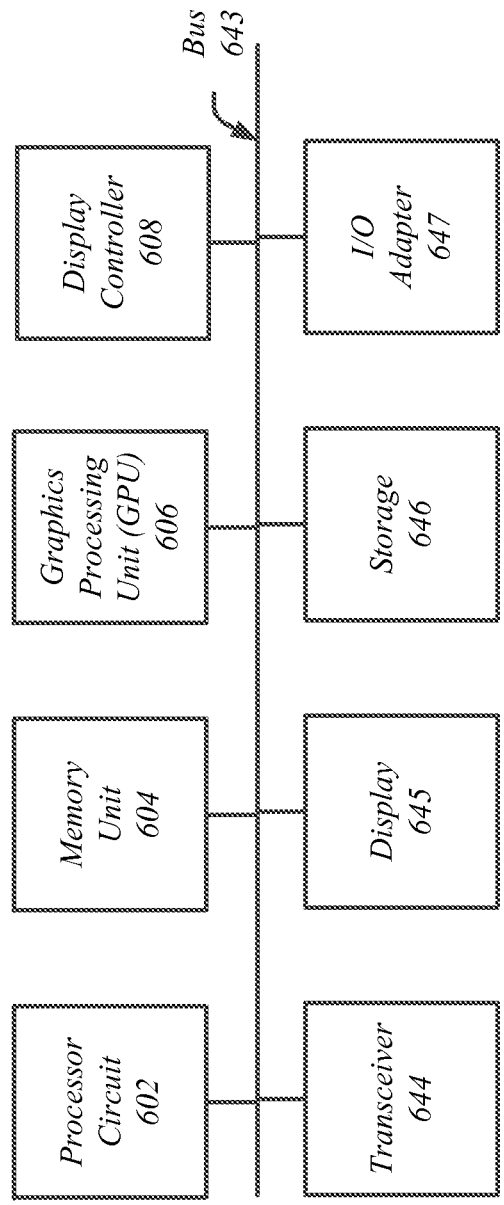
FIG. 6 illustrates an exemplary embodiment of a second computing system.

FIG. 6 illustrates one embodiment of a system 600. In various embodiments, system 600 may be representative of a system or architecture suitable for use with one or more embodiments described herein, such as computing system 100, logic flow 200 of FIG. 2, signaling flow 300 of FIG. 3, and/or logic flow 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a processor circuit 602. Processor circuit 602 may be implemented using any processor or logic device. The processing circuit 602 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 602 may be connected to and communicate with the other elements of the computing system via an interconnect 643, such as one or more buses, control lines, and data lines.

In at least one embodiment, system 600 may include a memory unit 604 to couple to processor circuit 602. Memory unit 604 may be coupled to processor circuit 602 via communications bus 643, or by a dedicated communications bus between processor circuit 602 and memory unit 604, as desired for a given implementation. Memory unit 604 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 600 may include a graphics processing unit (GPU) 606, in various embodiments. The GPU 606 may include any processing unit, logic or circuitry optimized to perform graphics-related operations as well as the video decoder engines and the frame correlation engines. The GPU 606 may be used to render 2-dimensional (2-D) and/or 3-dimensional (3-D) graphics for various applications such as video games, graphics, computer-aided design (CAD), simulation and visualization tools, imaging, etc. Various embodiments are not limited in this manner; GPU 606 may process any type of graphics data such as pictures, videos, programs, animation, 3D, 2D, objects graphics and so forth.

In some embodiments, computing device 600 may include a display controller 608. Display controller 608 may be any type of processor, controller, circuit, logic, and so forth for processing graphics information and displaying the graphics information. The display controller 608 may receive or retrieve graphics information from one or more buffers, such as a frame buffer. After processing the information, the display controller 608 may send the graphics information to a display.

In various embodiments, system 600 may include a transceiver 644. Transceiver 644 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 644 may operate in accordance with one or more applicable standards in any version. The embodiments are not limited in this context.

In various embodiments, system 600 may include a display 645. Display 645 may constitute any display device capable of displaying information received from processor circuit 602, and may be the same as or similar to display 142 of FIG. 1. In various embodiments, system 600 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 600 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
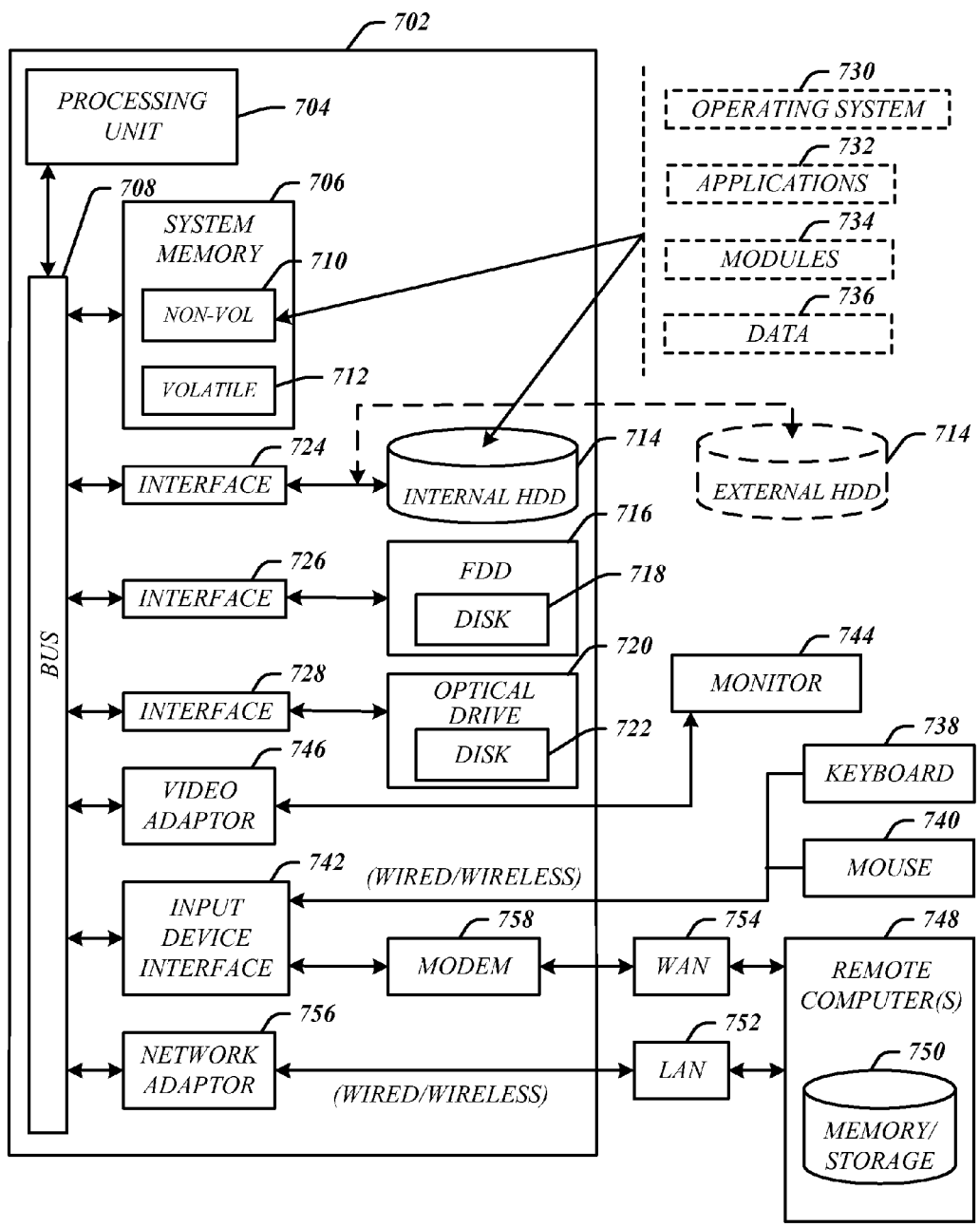
FIG. 7 illustrates an embodiment of a first computing architecture.

FIG. 7 illustrates an embodiment of an exemplary computing architecture 700 suitable for implementing various embodiments as previously described. In one embodiment, the computing architecture 700 may comprise or be implemented as part of computing system, such as computing system 100.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the computing system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three (1-33) provided below are intended to be exemplary and non-limiting.

Various embodiments are generally directed a system, device, apparatus and method for processing an encrypted graphic with a decryption key associated with a depth order policy including a depth position of a display scene, generating a graphic from the encrypted graphic when the encrypted graphic is successfully decrypted using the decryption key and assigning the graphic to a plane at the depth position of the display scene when the encrypted graphic is successfully decrypted.

In a first example, an apparatus, computing device or computing system may include a memory, a transceiver, processing circuitry, a policy enforcement module for execution on the processing circuitry to process an encrypted graphic with a decryption key associated with a depth order policy, the depth order policy including or defining a depth position of a display scene, and to generate a graphic from the encrypted graphic when the encrypted graphic is successfully decrypted using the decryption key and a display blender module for execution on the processing circuitry to assign the graphic to a plane at the depth position of the display scene when the encrypted graphic is successfully decrypted.

In a second example and in furtherance of the first example, the apparatus may include the display blender module to determine the plane at the depth position for the graphic based on the depth order policy.

In a third example and in furtherance of any of the previous examples, the apparatus, computing device, or computing system may include a display control module for execution on the processing circuitry to encrypt a graphic received from an application with the encryption key for securely communicating.

In a fourth example and in furtherance of any of the previous examples, the apparatus, computing device, or computing system may include the policy enforcement module to discard the encrypted graphic when the encrypted graphic is not successfully decrypted using the decryption key associated with the depth order policy.

In a fifth example and in furtherance of any of the previous examples, the apparatus, computing device, or computing system may include the display blender module to determine when the graphic is assigned a same depth position as a second graphic in the plane of the display scene and to determine when overlapping occurs between the graphic and the second graphic.

In a sixth example and in furtherance of any of the previous examples, the apparatus, computing device, computing system may include the display blender module to discard the graphic or the second graphic when overlapping occurs at the same depth position based on at least one priority criterion.

In a seventh example and in furtherance of any of the previous examples, the apparatus, computing device, computing system may include the display blender module to display both the graphic and the second graphic at the same depth position in plane of the display scene when no overlapping occurs. In an eighth example and in furtherance of any of the previous examples, the apparatus, computing device, computing system may include the depth position including a front depth position of the display scene.

In a ninth example and in furtherance of any of the previous examples, the apparatus, computing device, computing system may include a display metrics module to receive information indicating when the encrypted graphic is successfully decrypted by the decryption key or when the encrypted graphic is not successfully decrypted by the decryption key.

In a tenth example and in furtherance of any of the previous examples, a method may include processing an encrypted graphic with a decryption key associated with a depth order policy, the depth order policy including or defining a depth position of a display scene, generating a graphic from the encrypted graphic when the encrypted graphic is successfully decrypted using the decryption key and assigning the graphic to a plane at the depth position of the display scene when the encrypted graphic is successfully decrypted.

In an eleventh example and in furtherance of any of the previous examples, a method may include determining the plane at the depth position based on the depth order policy.

In a twelfth example and in furtherance of any of the previous examples, a method may include encrypting a graphic received from an application with the encryption key for securely communicating the graphic to display in the display scene.

In a thirteenth example and in furtherance of any of the previous examples, a method may include discarding the encrypted graphic when the encrypted graphic is not successfully decrypted using the decryption key associated with depth order policy.

In a fourteenth example and in furtherance of any of the previous examples, a method may include determining when the graphic is assigned a same depth position as a second graphic of the plane in the display scene and determining when overlapping occurs between the graphic and the second graphic.

In a fifteenth example and in furtherance of any of the previous examples, a method may include discarding the graphic or the second graphic when overlapping occurs at the same depth position based on at least one priority criterion.

In a sixteenth example and in furtherance of any of the previous examples, a method may include displaying both the graphic and the second graphic at the same depth position in the display scene when no overlapping occurs.

In a seventeenth example and in furtherance of any of the previous examples, a method may include maintaining information indicating when the encrypted graphic is successfully decrypted by the decryption key and when the encrypted graphic is not successfully decrypted by the decryption key.

In an eighteenth example and in furtherance of any of the previous examples, an article may include a computer-readable storage medium including a plurality of instructions that when executed enable a computing device to process an encrypted graphic with a decryption key associated with a depth order policy, the depth order policy including or defining a depth position of a display scene, generate a graphic from the encrypted graphic when the encrypted graphic is successfully decrypted using the decryption key and assign the graphic to plane at the depth position of the display scene when the encrypted graphic is successfully decrypted.

In a nineteenth example and in furtherance of any of the previous examples, an article may include a computer-readable storage medium including instructions that when executed enable the computing device to determine the plane at the depth position based on the depth order policy.

In a twentieth example and in furtherance of any of the previous examples, an article may include a computer-readable storage medium including instructions that when executed enable the computing device to encrypt a graphic received from an application with the encryption key for securely communicating the graphic to display in the display scene.

In a twenty-first example and in furtherance of any of the previous examples, an article may include a computer-readable storage medium including instructions that when executed enable the computing device to discard the encrypted graphic when the encrypted graphic is not successfully decrypted using the decryption key associated with depth order policy.

In a twenty-second example and in furtherance of any of the previous examples, an article may include a computer-readable storage medium including instructions that when executed enable the computing device to determine when the graphic is assigned a same depth position as a second graphic of the plane in the display scene and determining when overlapping occurs between the graphic and the second graphic.

In a twenty-third example and in furtherance of any of the previous examples, an article may include a computer-readable storage medium including instructions that when executed enable the computing device to discard the graphic or the second graphic when overlapping occurs at the same depth position based on at least one priority criterion.

In a twenty-fourth example and in furtherance of any of the previous examples, an article may include a computer-readable storage medium including instructions that when executed enable the computing device to display both the graphic and the second graphic at the same depth position in the display scene when no overlapping occurs.

In a twenty-fifth example and in furtherance of any of the previous examples, an article may include a computer-readable storage medium including instructions that when executed enable the computing device to maintain information indicating when the encrypted graphic is successfully decrypted by the decryption key and when the encrypted graphic is not successfully decrypted by the decryption key.

In a twenty-sixth example and in furtherance of any of the previous examples, an apparatus may include means for processing an encrypted graphic with a decryption key associated with a depth order policy, the depth order policy to define a depth position of a display scene, means for generating a graphic from the encrypted graphic when the encrypted graphic is successfully decrypted using the decryption key and means for assigning the graphic to a plane at the depth position of the display scene when the encrypted graphic is successfully decrypted In a twenty-seventh example and in furtherance of any of the previous examples, an apparatus may include means for determining the plane at the depth position based on the depth order policy.

In a twenty-eighth example and in furtherance of any of the previous examples, an apparatus may include means for encrypting a graphic received from an application with the encryption key for securely communicating the graphic to display in the display scene.

In a twenty-ninth example and in furtherance of any of the previous examples, an apparatus may include means for discarding the encrypted graphic when the encrypted graphic is not successfully decrypted using the decryption key associated with depth order policy.

In a thirtieth example and in furtherance of any of the previous examples, an apparatus may include means for determining when the graphic is assigned a same depth position as a second graphic of the plane in the display scene and means for determining when overlapping occurs between the graphic and the second graphic.

In a thirty-first example and in furtherance of any of the previous examples, an apparatus may include means for discarding the graphic or the second graphic when overlapping occurs at the same depth position based on at least one priority criterion.

In a thirty-second example and in furtherance of any of the previous examples, an apparatus may include means for displaying both the graphic and the second graphic at the same depth position in the display scene when no overlapping occurs.

In a thirty-third example and in furtherance of any of the previous examples, an apparatus may include means for maintaining information indicating when the encrypted graphic is successfully decrypted by the decryption key and when the encrypted graphic is not successfully decrypted by the decryption key.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   processing circuitry;
   a policy enforcement module for execution on the processing circuitry to:
      receive a depth order policy and a decryption key, the depth order policy assigned to a graphic associated with an application and to define a depth position of a display scene, the decryption key unique to the application and associated with the depth order policy
      identify whether the depth order policy is enforceable,
      discard the depth order policy and the decryption key when the depth order policy is unenforceable,
      request an encrypted graphic and process the encrypted graphic with the decryption key when the depth order policy is enforceable, and
      generate the graphic associated with the application from the encrypted graphic when the encrypted graphic is successfully decrypted using the decryption key; and
   a display blender module for execution on the processing circuitry to assign the graphic to a plane at the depth position of the display scene when the encrypted graphic is successfully decrypted.

2. The apparatus of claim 1, the display blender module to determine the plane at the depth position for the graphic based on the depth order policy.

3. The apparatus of claim 1, comprising:
   a display control module for execution on the processing circuitry to:
      encrypt a graphic received from the application with an encryption key for securely communicating.

4. The apparatus of claim 1, the policy enforcement module to discard the encrypted graphic when the encrypted graphic is not successfully decrypted using the decryption key associated with the depth order policy.

5. The apparatus of claim 1, the display blender module to determine when the graphic is assigned a same depth position as a second graphic in the plane of the display scene, the second graphic associated with a second application, and to determine when overlapping occurs between the graphic and the second graphic.

6. The apparatus of claim 5, the display blender module to discard the graphic or the second graphic when overlapping occurs at the same depth position based on comparison of a first priority level associated with the application and a second priority level associated with the second application.

7. The apparatus of claim 5, the display blender module to display both the graphic and the second graphic at the same depth position in plane of the display scene when no overlapping occurs.

8. The apparatus of claim 1, the depth position comprising a front depth position of the display scene.

9. The apparatus of claim 1, comprising:
   a display metrics module to receive information indicating when the encrypted graphic is successfully decrypted by the decryption key or when the encrypted graphic is not successfully decrypted by the decryption key.

10. A computer-implemented method, comprising:
    receiving a depth order policy and a decryption key, the depth order policy assigned to a graphic associated with an application and to define a depth position of a display scene the decryption key unique to the application and associated with the depth order policy;
    identifying whether the depth order policy is enforceable;
    discarding the depth order policy and the decryption key when the depth order policy is unenforceable;
    requesting an encrypted graphic and processing the encrypted graphic with the decryption key when the depth order policy is enforceable;
    generating the graphic associated with the application from the encrypted graphic when the encrypted graphic is successfully decrypted using the decryption key; and
    assigning the graphic to a plane at the depth position of the display scene when the encrypted graphic is successfully decrypted.

11. The computer-implemented method of claim 10, comprising:
    determining the plane at the depth position based on the depth order policy.

12. The computer-implemented method of claim 10, comprising:
    encrypting a graphic received from the application with an encryption key for securely communicating the graphic to display in the display scene.

13. The computer-implemented method of claim 10, comprising:
    discarding the encrypted graphic when the encrypted graphic is not successfully decrypted using the decryption key associated with depth order policy.

14. The computer-implemented method of claim 10, comprising:
    determining when the graphic is assigned a same depth position as a second graphic of the plane in the display scene, the second graphic associated with a second application; and
    determining when overlapping occurs between the graphic and the second graphic.

15. The computer-implemented method of claim 14, comprising:
    discarding the graphic or the second graphic when overlapping occurs at the same depth position based on comparison of a first priority level associated with the application and a second priority level associated with the second application.

16. The computer-implemented method of claim 14, comprising:
    displaying both the graphic and the second graphic at the same depth position in the display scene when no overlapping occurs.

17. The computer-implemented method of claim 10, comprising:
    maintaining information indicating when the encrypted graphic is successfully decrypted by the decryption key and when the encrypted graphic is not successfully decrypted by the decryption key.

18. An article comprising a non-transitory computer-readable storage medium comprising a plurality of instructions that when executed enable a computing device to:
  receive a depth order policy and a decryption key, the depth order policy assigned to a graphic associated with an application and to define a depth position of a display scene, the decryption key unique to the application and associated with the depth order policy;
  identify whether the depth order policy is enforceable;
  discard the depth order policy and the decryption key when the depth order policy is unenforceable;
  request an encrypted graphic and process the encrypted graphic with the decryption key when the depth order policy is enforceable;
  generate the graphic associated with the application from the encrypted graphic when the encrypted graphic is successfully decrypted using the decryption key; and
  assign the graphic to plane at the depth position of the display scene when the encrypted graphic is successfully decrypted.

19. The article of claim 18, comprising instructions that when executed enable the computing device to:
  determine the plane at the depth position based on the depth order policy.

20. The article of claim 18, comprising instructions that when executed enable the computing device to:
  encrypt a graphic received from the application with an encryption key for securely communicating the graphic to display in the display scene.

21. The article of claim 18, comprising instructions that when executed enable the computing device to:
  discard the encrypted graphic when the encrypted graphic is not successfully decrypted using the decryption key associated with depth order policy.

22. The article of claim 18, comprising instructions that when executed enable the computing device to:
  determine when the graphic is assigned a same depth position as a second graphic of the plane in the display scene, the second graphic associated with a second application; and
  determine when overlapping occurs between the graphic and the second graphic.

23. The article of claim 22, comprising instructions that when executed enable the computing device to:
  discard the graphic or the second graphic when overlapping occurs at the same depth position based on comparison of a first priority level associated with the application and a second priority level associated with the second application.

24. The article of claim 22, comprising instructions that when executed enable the computing device to:
  display both the graphic and the second graphic at the same depth position in the display scene when no overlapping occurs.

25. The article of claim 18, comprising instructions that when executed enable the computing device to:
  maintain information indicating when the encrypted graphic is successfully decrypted by the decryption key and when the encrypted graphic is not successfully decrypted by the decryption key.

* * * * *